US008107978B2

(12) United States Patent
Anderl et al.

(10) Patent No.: US 8,107,978 B2
(45) Date of Patent: Jan. 31, 2012

(54) ADDRESSING VOICE SMS MESSAGES

(75) Inventors: Ewald C. Anderl, Middletown, NJ (US);
Ajay Kumar Thapar, Bangalore (IN);
**Chinna Marudhu Pandian
Chockalingam**, Bangalore (IN)

(73) Assignee: Kirusa Inc. NJ (US)

( * ) Notice: Subject to any disclaimer, the term of this patent is extended or adjusted under 35 U.S.C. 154(b) by 867 days.

(21) Appl. No.: 12/056,300

(22) Filed: Mar. 27, 2008

(65) Prior Publication Data

US 2008/0268817 A1 Oct. 30, 2008

(30) Foreign Application Priority Data

Apr. 25, 2007 (IN) .............................. 871/CHE/2007

(51) Int. Cl.
*H04W 4/00* (2009.01)
(52) U.S. Cl. ..................... 455/466; 455/413; 455/412.1; 379/88.12
(58) Field of Classification Search .................. 455/413, 455/412.1, 412.2, 466; 379/88.12, 88.13, 379/88.18, 88.25, 88.26
See application file for complete search history.

(56) References Cited

U.S. PATENT DOCUMENTS

| | | | | |
|---|---|---|---|---|
| 5,872,925 A * | 2/1999 | Han | ............................. | 709/206 |
| 7,013,155 B1 * | 3/2006 | Ruf et al. | ...................... | 455/466 |
| 7,702,739 B1 * | 4/2010 | Cheng et al. | .................. | 709/207 |
| 2004/0106413 A1 * | 6/2004 | Sambin | ...................... | 455/456.1 |
| 2005/0286689 A1 | 12/2005 | Vuori | | |
| 2006/0172750 A1 * | 8/2006 | Mizoguchi | .................... | 455/466 |
| 2007/0123280 A1 * | 5/2007 | McGary et al. | .............. | 455/466 |
| 2007/0260456 A1 * | 11/2007 | Proux et al. | ................... | 704/235 |
| 2007/0275739 A1 * | 11/2007 | Blackburn | .................... | 455/466 |
| 2008/0008162 A1 * | 1/2008 | Martinez et al. | .............. | 370/352 |

FOREIGN PATENT DOCUMENTS

| | | |
|---|---|---|
| EP | 01/13656 A1 | 2/2001 |
| IL | 02/49319 A2 | 6/2002 |
| WO | WO 03/024069 * | 3/2003 |
| WO | 2005/062976 A2 | 7/2005 |

* cited by examiner

*Primary Examiner* — Kamran Afshar
*Assistant Examiner* — Marisol Fahnert
(74) *Attorney, Agent, or Firm* — Ash Tankha; Lipton, Weinberger & Husick

(57) ABSTRACT

Disclosed herein is a method and system for allowing voice short message service (SMS) messaging using methods of recipient addressing as used by text SMS messaging. A user creates a text SMS message and addresses the message to a recipient. The address of the recipient may be obtained from the address book stored locally on the user's mobile device. A client application intercepts the text SMS message and prompts whether the user wants to include a voice SMS message. If the user wants to include the voice SMS message, the user's voice message is recorded on a server. The text message along with a notification of the voice message is transmitted to the recipient. The recipient may use the information in the voice message notification to access and listen to the user's recorded voice message.

16 Claims, 9 Drawing Sheets

ADDRESSING VOICE SMS MESSAGES

CROSS REFERENCE TO RELATED APPLICATIONS

The following patents are incorporated herein as references:
1. This application claims the benefit of the provisional patent application titled "Method and System for Voice SMS Messaging", bearing the application number 871/CHE/2007, and filed on Apr. 25, 2007 at the Indian Patent Office.
2. Non-provisional Indian patent application titled "Method and System for Voice SMS Messaging", bearing the application number 871/CHE/2007, and filed on Jan. 24, 2008 at the Indian Patent Office.
3. Patent application with U.S. Pat. No. 7,184,786 titled "Techniques for combining Voice with Text Short Message Services" assigned to Kirusa, Inc., NJ, USA.
4. Indian patent application with patent number 2775/CHENP/2006 titled "Techniques for combining Voice with Wireless Text Short Message Services" assigned to Kirusa, Inc., NJ, USA
5. Indian patent application with patent number 3495/CHENP/2005 titled "A Method and System for Communicating a Data File over a Network and Teleconferencing Over a Telephony Network" assigned to Kirusa, Inc., NJ, USA.
6. Indian patent application with patent number 4503/CHENP/2006 titled "Methods for Identifying Messages and Communicating with Users of a Multimodal Message Service" assigned to Kirusa, Inc., NJ, USA.

BACKGROUND

This invention, in general, relates to sending and receiving short messages between wireless telephony users. More particularly, this invention relates to voice short message service (SMS) messaging using standard methods of recipient addressing as used by text SMS messaging.

In addition to the usual wireless telephony that cellular telephones provide, such devices are also widely used for sending short message service (SMS) messages between wireless users.

More recently new devices and supporting network services are being introduced that allow a more general class of messages to be sent between the wireless devices, where the messages include voice, still images, and even moving images. One of the prevalent services used today, besides text SMS messaging, is voice SMS messaging.

The existing methods of voice SMS messaging employ a mobile station integrated services digital network (MSISDN) number of the recipient's mobile device to send voice SMS messages. These methods require a sender to input the recipient's address through a user input interface. The current methods of text SMS messaging may use the addresses stored on the user's mobile device or the addresses manually entered by the user for addressing the text messages. The recipient address may be stored in the mobile device's native address book or on the subscriber identity module (SIM) card in the mobile device. However, the existing methods for voice SMS messaging do not allow the sender to practically use addresses stored in a local address book in the mobile device for selecting the recipients.

In view of the foregoing discussion, there is a need for a method and system for sending voice SMS messages to recipients, using recipients' addresses stored in an address book. The method and system must overcome the limitation of a user input requirement for addressing the recipients of the voice SMS messages.

SUMMARY OF THE INVENTION

The method and system disclosed herein, allows voice short message service (SMS) messaging using standard methods of recipient addressing as used by text SMS messaging. Exemplarily, recipient addressing comprises use of a call history stored in the user's mobile device, to address the voice SMS message.

A user creates a text SMS message and addresses the text message to a recipient, using the recipient's address that may be stored in a local address book, in the mobile device call history, or manually entered by the user on the mobile device. A client application provisioned on the user's mobile device intercepts the addressed text SMS message and prompts whether the user wants to include voice content in the text SMS message. If the user chooses to include voice content, the user's voice message is recorded on a server. The text message along with a notification of the voice message is transmitted to the addressed recipient. The recipient may use the voice message notification to access and listen to the user's recorded voice message.

The method and system disclosed herein can be implemented using standard wireless telephone devices capable of sending and receiving text SMS messages. Further, the disclosure herein is not limited to wireless phones but will also work with wired line phones with SMS capabilities and services over such wireline devices.

BRIEF DESCRIPTION OF DRAWINGS

The foregoing summary, as well as the following detailed description of the embodiments, is better understood when read in conjunction with the appended drawings. For the purpose of illustrating the invention, exemplary constructions of the invention are shown in the drawings. However, the invention is not limited to the specific methods and instrumentalities disclosed herein.

DETAILED DESCRIPTION OF THE INVENTION

Figure 1:
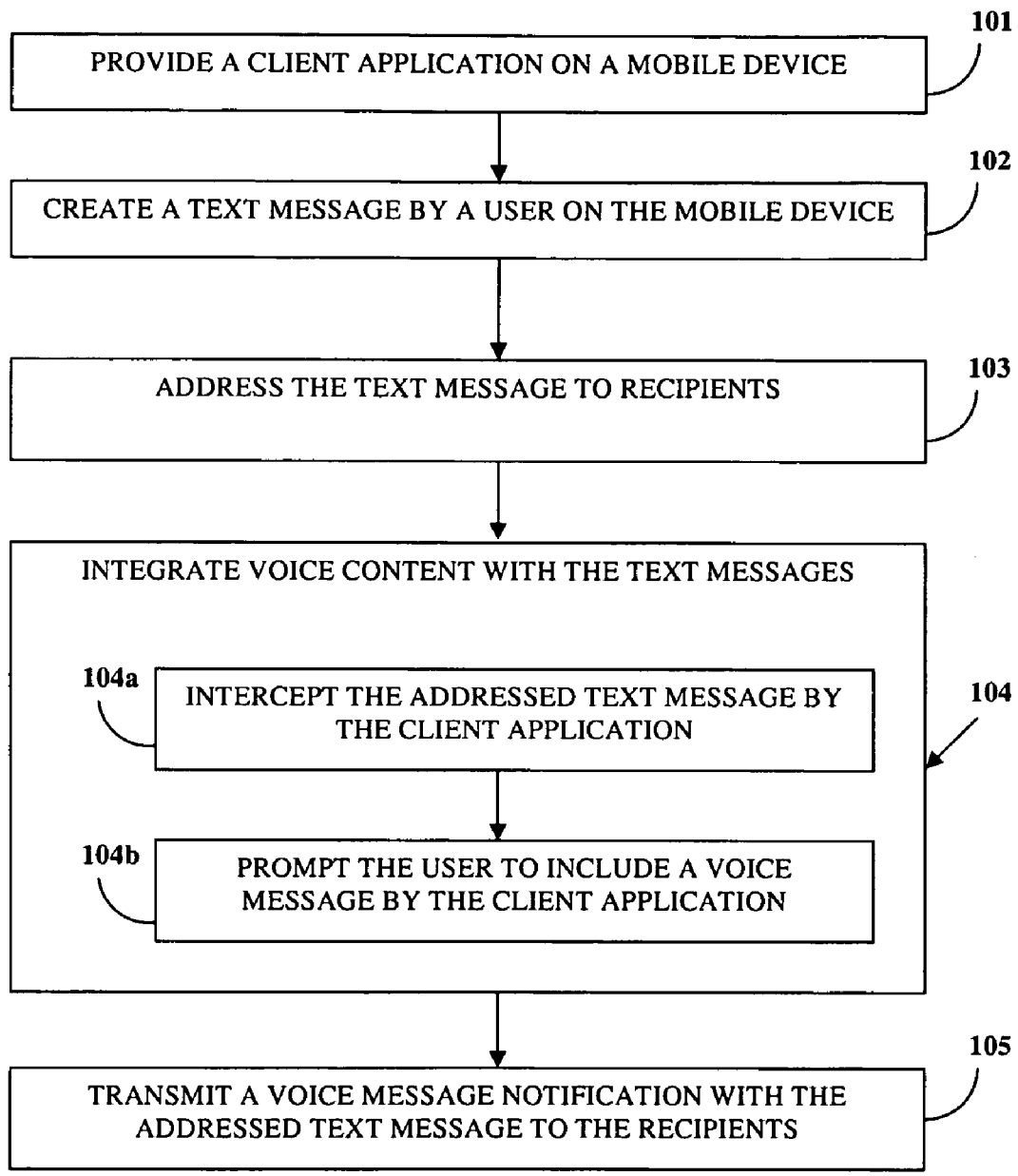
FIG. 1 illustrates a method for integrating voice content with text content in a wireless text messaging service.

FIG. 1 illustrates the method for integrating voice content with text content in a wireless text messaging service. In the disclosed method, voice short message service (SMS) messaging is combined with the standard methods of recipient addressing as employed in text SMS messaging.

A client application 201a is provided 101 on a user's mobile device 201. In one embodiment, the client application 201a resides in a native application environment 304 present on the mobile device 201. The native application environment 304 is specific to the internal operating system used in the mobile device 201. The native application is provided to enable access to the internal operating system and to the device functionalities of the mobile device 201. Examples of internal operating systems used in mobile devices include Symbian of Symbian Ltd., Windows® of Microsoft Inc., Linux, Mac OS from Apple Inc., etc., that may support a high level language interface such as Java™ of Sun Microsystems Inc. The client application 201a intercepts normal text SMS messaging operations such as addressing, composing the text message, sending the text message, etc.

In another embodiment, the client application 201a resides on the subscriber identity module (SIM) card of the mobile device 201. The client application 201a is deployed on to the mobile device 201 via one of a mobile network, a general packet radio service (GPRS) technology, an SMS, or preloaded on to the SIM of the mobile device 201.

The user 202 creates 102 a text SMS message employing the user interface 201c provided on the mobile device 201. The user 202 then addresses 103 the text message to specific recipients using the standard methods for addressing text SMS message. A recipient's address may be a mobile station integrated services digital network (MSISDN) number or a telephone number. In one embodiment, the recipient's address may be stored in a native address book on the mobile device 201. In another embodiment, the recipient's address may be stored on the SIM of the mobile device 201. The user 202 may also address the text message by manually entering the recipient's address, for example the MSISDN number, on the mobile device 201.

In order to integrate 104 the text SMS message with voice content, the client application 201a intercepts 104a the addressed text SMS message. The client application 201a then prompts 104b the user 202 as to whether a voice SMS message needs to be included. If the user 202 prefers not include a voice SMS message, the client application 201a sends the intercepted text SMS message to the recipient. If the user 202 prefers to additionally add a voice SMS message, the client application 201a connects the mobile device 201 to a server 314. The user's voice message is recorded and stored on the server 314.

A voice message notification is attached to the text SMS message and transmitted 105 to the addressed recipients. The recipients on receiving the text SMS message may use the information in the voice message notification to access and listen to the user's voice message stored on the server 314.

Figure 2A:
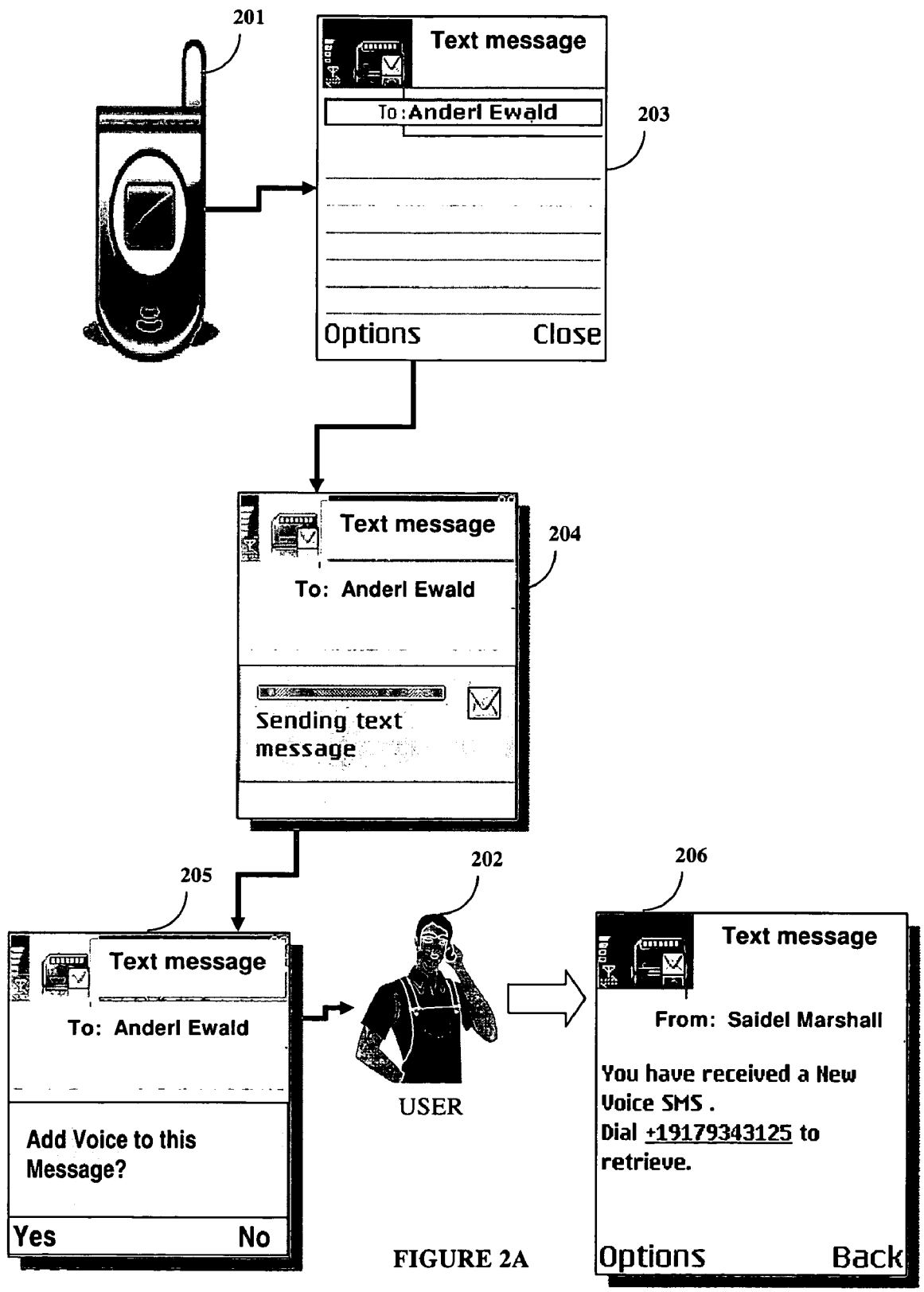
FIG. 2A illustrates a method for addressing a voice short message service (SMS) message with the methods of single recipient addressing as used by text SMS messaging.

FIG. 2A illustrates the method for addressing a voice SMS message with the methods of single recipient addressing as used by text SMS messaging. In order to send an SMS message 203 to a particular recipient, the user 202 may use the recipient address stored in a native address book. The native address book may be stored in a memory storage means 201b of the mobile device 201 or on the SIM of the mobile device 201. The native address book stores multiple addresses from which the user 202 may select the recipient's address. Once the text SMS message is addressed to a recipient using a built-in text SMS application 301, the text SMS message is intercepted 204 by a client application 201a. The user 202 is then prompted by the client application 201a to add a voice SMS message 205. In order to create a voice SMS message; the client application 201a connects the user's mobile device 201 to a server 314 for recording the user's voice message. The server 314 is further provided with information about the recipient to whom a voice message notification has to be sent. The user's voice message is recorded on the server 314 and a voice message notification is attached to the text SMS message. The text SMS message along with the voice message notification is then sent to the addressed recipient 206. In one embodiment, if the text message body is blank, the recipient's information may be sent to the server 314 by transmitting the dial string '*MSISDN' to the server 314 as part of the connection process. If the message body is not blank, it is advantageous to send the recipient information before or as a part of the connection process to the server 314. For example, the address information could be sent via out-of-band signaling unstructured supplementary service data (USSD) or as a background text SMS message containing the address and text information.

The method of addressing a voice SMS message to a single recipient described above, additionally allows the user 202 to address voice SMS messages by using the recipient's address from the user's call history stored on the mobile device. During voice SMS messaging, the methods of addressing, message creation, message sending, etc., ensures that the user experience remains unchanged from that of text SMS messaging.

Figure 2B:
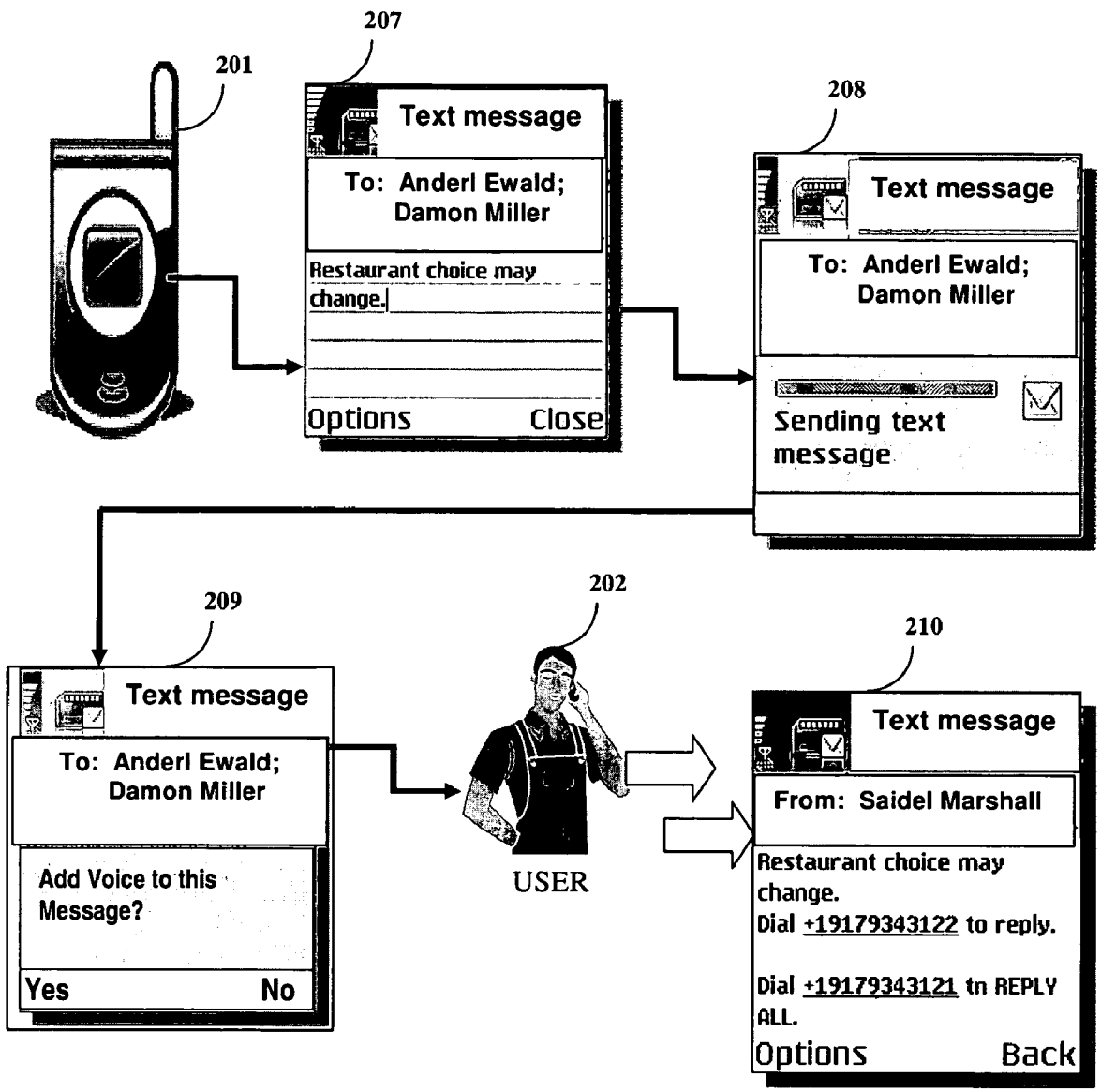
FIG. 2B illustrates a method for addressing a voice SMS message with the methods of multiple recipient addressing as used by text SMS messaging.

FIG. 2B illustrates a method for addressing a voice SMS message with the methods of multiple recipient addressing as used by text SMS messaging. The client application 201a may allow the user 202 to send a common voice SMS message to a plurality of recipients. The plurality of recipients may be addressed by common group messages enhanced with voice SMS messaging capability. When the text SMS message is addressed 207 to a plurality of recipients using a built-in text SMS application 301, the text SMS message is intercepted 208 by a client application 201a. The user 202 is then prompted to add a voice SMS message 209. Upon the user's confirmation of including a voice SMS message in the intercepted text SMS message, the user's mobile device 201 is connected to a server 314. The user's voice message is then recorded on to the server 314 and a voice message notification is attached to the text SMS message. The text SMS message along with the voice message notification is sent to the plurality of recipients 210. In one embodiment of the disclosed method, a reply option may be provided to each of the plurality of recipients. Upon receiving a voice SMS message, each of the recipients may use voice SMS messaging to reply back to the user. Each recipient may further reply to the user's voice SMS message using a group reply option. In another embodiment, a reply-all option may be employed in group messages. Using the reply-all option a particular recipient may send a voice SMS message to all the other recipients including the user 202.

The following application scenario expands on the method of addressing a voice SMS message to multiple recipients.

Alice creates a text SMS message and addresses the message to Bob and Mary. Alice uses the addresses of Bob and Mary stored in an address book. The address book may be stored on Alice's mobile device.

The addressed text SMS message is intercepted by the client application 201a on Alice's mobile device. The client application 201a prompts Alice on her mobile device display, 'Do you want to add a voice message?' Alice selects the 'Yes' option, using the user interface 201c on her mobile device. The client application 201a connects the mobile device to a server 314 through a wireless network interface. Alice speaks on her mobile device, and her voice is recorded at the server 314. In addition, the addressed text message is sent to the server 314.

The server 314 adds a voice message notification, 'You have received a new Voice message' in the addressed text message and sends the message to Bob and Mary. Bob and Mary, upon receiving the text SMS message may click on a 'Listen to Voice message' link included in the voice message notification. On clicking the link, Bob and Mary may directly listen to Alice's voice message. Alternatively, the recipients may dial the number in the voice message notification. The number may be a short code, such as *0*, providing access to all new messages.

When a voice SMS message is delivered to a plurality of recipients, the recipients may hear one or more of the following: an optional text to speech conversion (TTS) of the text SMS message, for example: "Restaurant Choice may change"; or any additional audio recorded with the message.

Figure 3A:
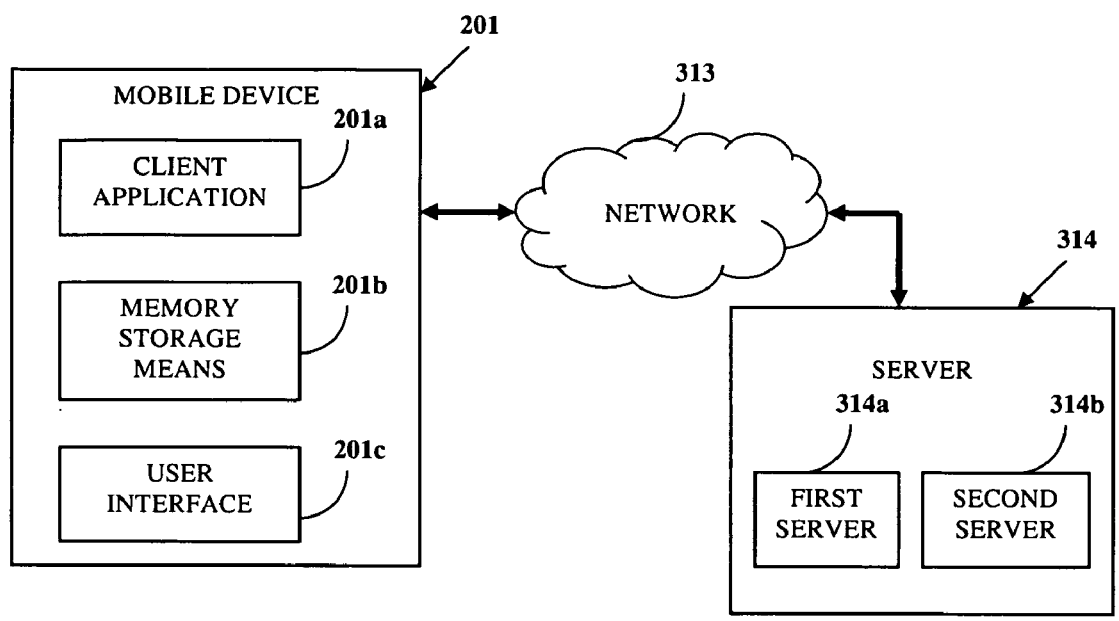
FIG. 3A exemplarily illustrates a system for voice short message service messaging.
Figure 3B:
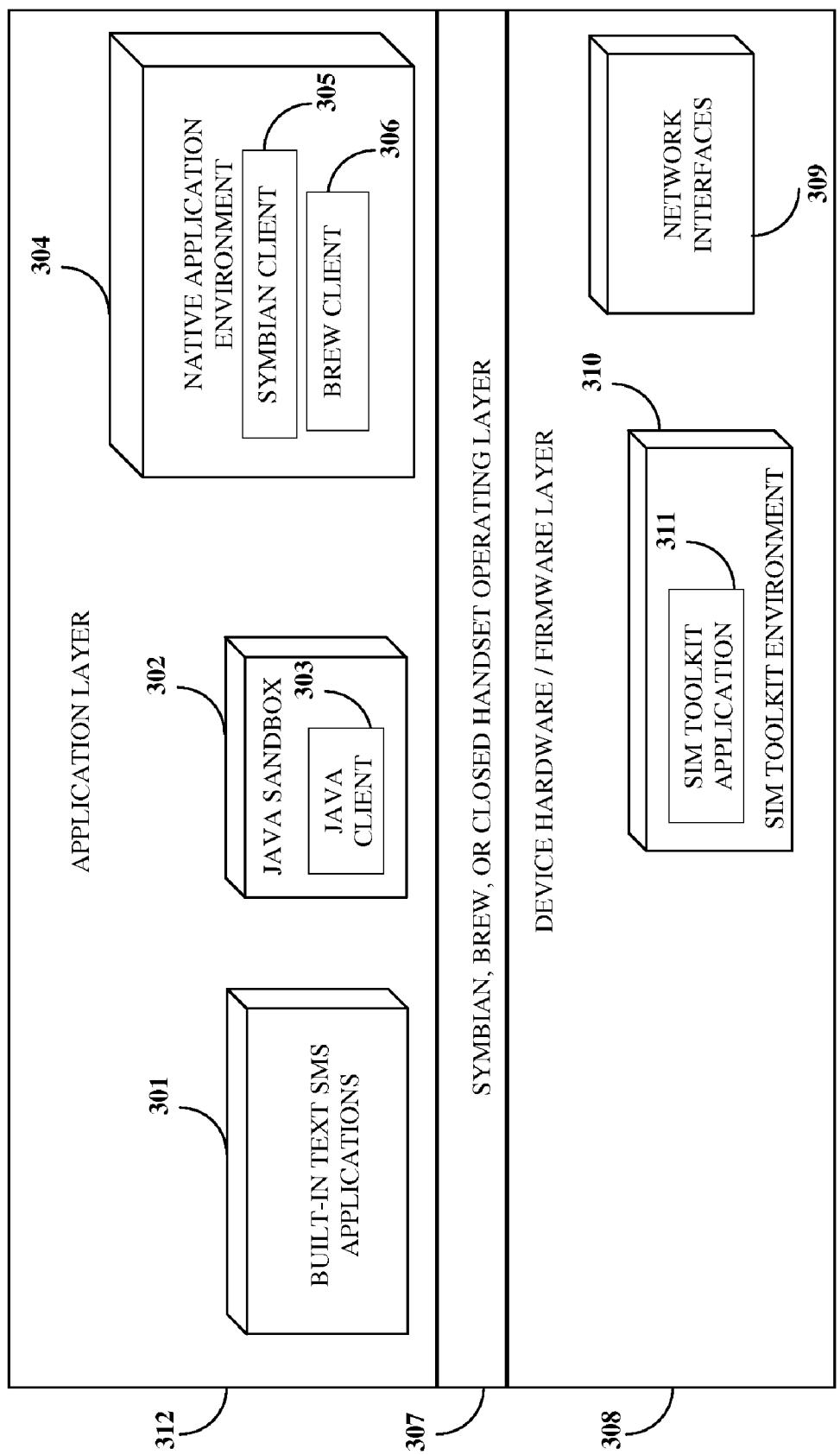
FIG. 3B illustrates a system for addressing a voice SMS message with the methods of addressing as used by text SMS messaging.

FIG. 3A exemplarily illustrates a system for voice short message service messaging. The system disclosed herein comprises a mobile device 201 and the server 314 connected via a network 313. The mobile device 201 comprises a client application 201a, a user interface 201c, and a memory storage means 201b. The client application 201a integrates voice content to a text message created by a user 202 using methods of recipient addressing as used by text short message service messaging. The client application 201a may be implemented in the application layer, or in the hardware and firmware layer of the mobile device 201 as illustrated in FIG. 3B. The user 202 accesses a list of addresses of recipients stored in the memory storage means 201b of the mobile device 201. The user 202 inputs voice messages and text messages through the user interface 201c on the mobile device 201. The server 314 stores the voice messages of the user and transmits a voice message notification with a text message to addressed recipients. In an embodiment, the server 314 may comprise one or more servers or hardware devices, each performing one or more functionalities. For example, the server 314 may comprise a first server 314a and a second server 314b. The first server 314a may store the voice SMS messages of the user. The second server 314b may transmit text SMS messages along with the attached voice message notification to the addressed recipients.

FIG. 3B illustrates a system for addressing a voice SMS message with the methods of addressing as used by text SMS messaging. The system disclosed comprises three layers. The first layer 312 is an application layer comprising a built-in text SMS application 301, a Java sandbox 302 and a native application environment 304. The second layer 307 is an operating system layer. The operating system may be one of Symbian, Windows, Linux, etc. The third layer 308 is a hardware and firmware layer comprising a SIM toolkit environment 310 and a network interface 309.

A client application 201a is used for creating and sending a voice SMS message. The client application 201a may be implemented in the first layer 312, i.e. the application layer, or in the third layer 308, i.e. the hardware and firmware layer of the mobile device 201. The client application 201a implemented on the first layer 312 is specific to the operating system of the mobile device 201. The internal operating system may support a high level language interface such as Java. The high level language Java client 303 is executed on a Java sandbox 302. The client application 201a in the first layer 312 may be one of, but not restricted to, a binary runtime environment for wireless (BREW) client 306, a Java client 303 or a Symbian client 305 residing in the native application environment 304. The client application 201a in the third layer 308 is a SIM toolkit application 311 residing on a SIM toolkit environment 310. The user 202 creates and addresses a text SMS message using a built-in text SMS application 301 such as an SMS client. The network interface 309 of the mobile device 201 transmits and receives text messages, voice messages, voice calls, etc., over the wireless network 313. The network interface 309 includes interfaces such as the data interfaces to short message services center and the telephony interfaces for voice connections.

The system disclosed herein uses a server 314 for recording the user's voice message and transmitting the recorded voice message to addressed recipients. The server 314 may comprise a first server 314a and a second server 314b as illustrated in FIG. 3A. The first server 314a stores voice SMS message inputted by the user. The second server 314b transmits a text SMS message along with an attached voice message notification to the addressed recipients.

Figure 4:
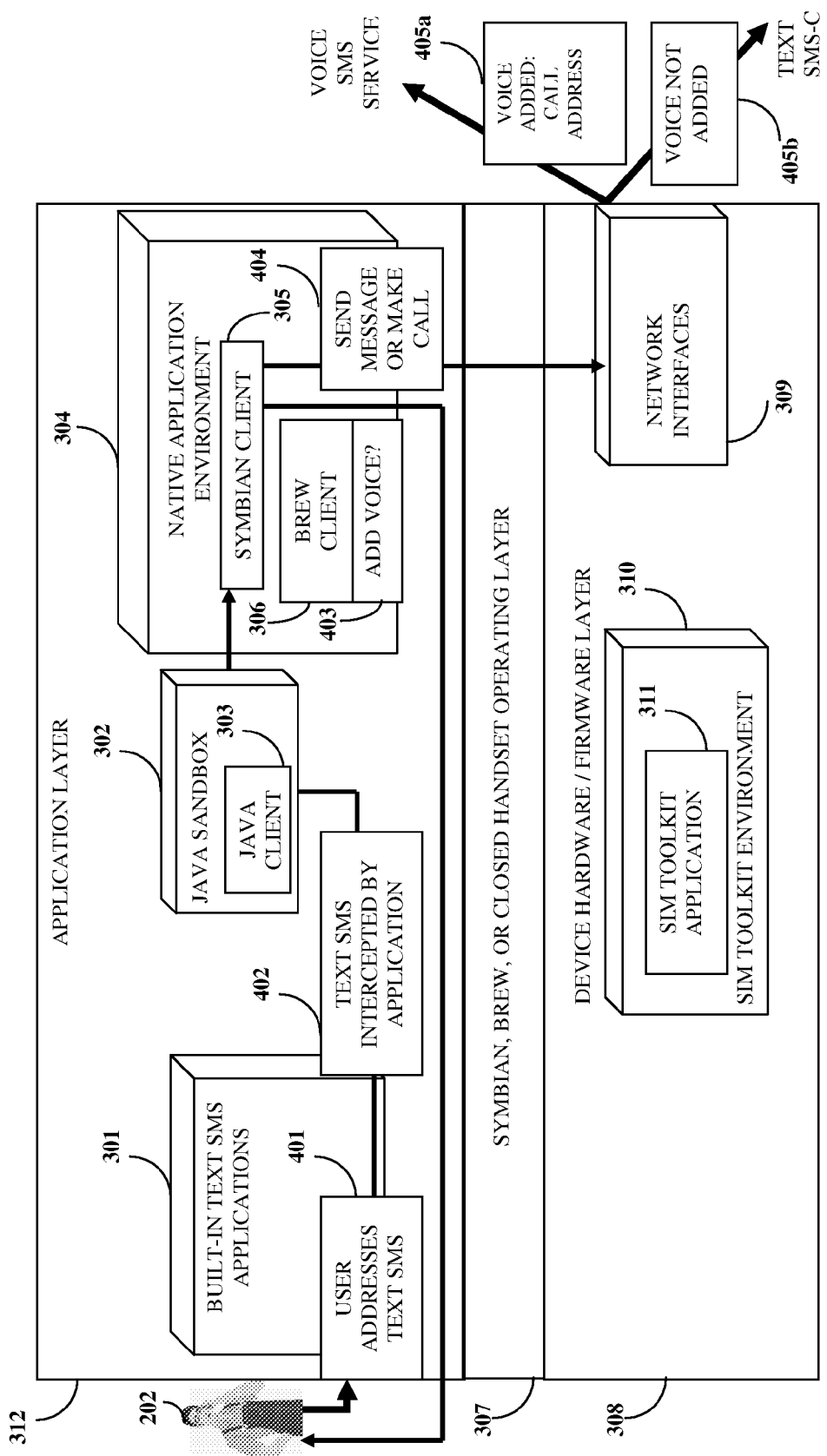
FIG. 4 illustrates a first embodiment of the method for sending a voice SMS message to a single recipient using a client application.

FIG. 4 illustrates a first embodiment of a method for sending a voice SMS message to a single recipient using a client application 201a. In the example shown in FIG. 4, the operating system is Symbian and the client application 201a is a native Symbian client 305. A user 202 addresses a text SMS message 401 using a built-in text SMS application 301 on the mobile device 201. The text SMS message is addressed to a single recipient using the recipient's address stored in the native address book or other integrated source of address such as the user's call history. The user 202 may also address the text SMS message by manually inputting the recipient's address on the mobile device 201.

The native Symbian client application 305 intercepts 402 the addressed text SMS message. The user 202 is prompted whether a voice SMS message needs to be included or not, and accordingly makes a call to the server 314 or sends the addressed text SMS message 404. If the user 202 chooses to include 403 a voice SMS message, the user 202 is connected to a server 314 through the network interface 309 provided as a part of the mobile device's hardware. In order to record the voice message, the user 202 may be connected to the server 314 to record the voice message on the server 314 or the message may be recorded locally by the client and later transmitted to the server 314 in the network 313. After the recording is complete, a voice message notification is added in the text SMS message and transmitted to the addressed recipient 405a. The voice message notification may be added to the text SMS message by forwarding the addressed text SMS message to the server 314 via a data transport such as SMS, USSD, or Hypertext Transfer Protocol (HTTP). The voice notification is added to the addressed text SMS message in the server 314. In another embodiment, the voice message notification may be added to the addressed text SMS message by the client application 201a. The client application 201a communicates with the server 314 and receives the information required for the construction of the voice message notification from the server 314. The client application 201a based on the received information may add the voice message notification to the text SMS message. Information required to construct the voice message notification optionally includes the notification template (SMS text) and information as discussed in Indian patent application number 4503/CHENP/2006 titled "Methods for Identifying Messages and Communicating with Users of a Multimodal Message Service". The recipient may access the recorded voice message on the server 314 through the information included in the voice message notification. If the user 202 chooses to send a text message without including a voice message, the message is sent to the recipient as a normal text message 405*b*.

Figure 5:
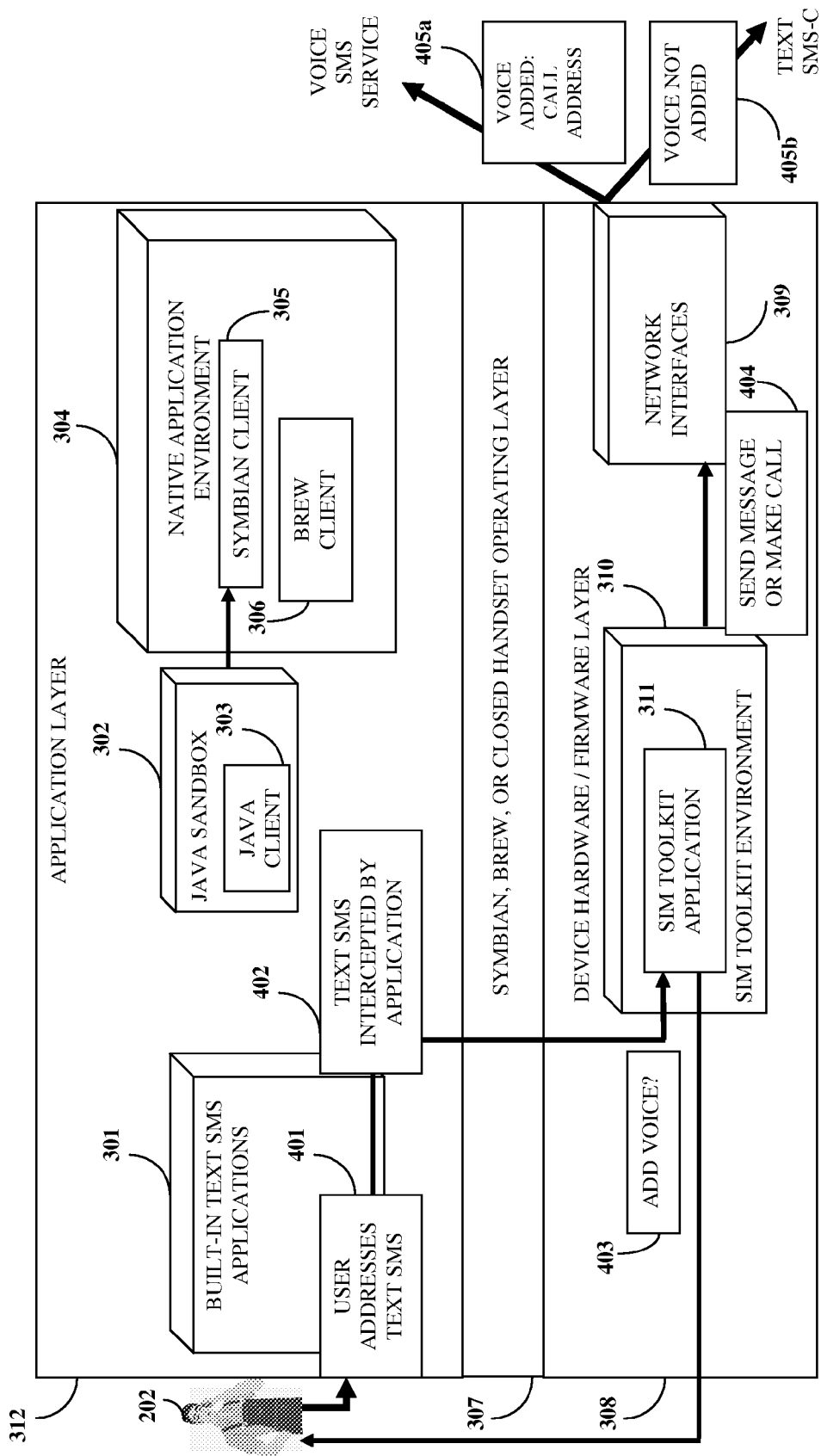
FIG. 5 illustrates a second embodiment of the method for sending a voice SMS message to a single recipient using a client application.

FIG. 5 illustrates a second embodiment of the method for sending a voice SMS message to a single recipient, using a client application 201*a*. The second embodiment of the disclosed system is functionally similar as that of the first embodiment. However, the client application 201*a* is implemented as a SIM toolkit application 311 in a SIM toolkit environment 310. A user addresses 401*a* text SMS message using a built-in text SMS application 301 on the user's mobile device 201. The text SMS message is addressed to a single recipient using the recipient's address stored in the native address book. The SIM toolkit application 311 intercepts 402 the addressed text SMS message. The user 202 is prompted whether to include a voice SMS message or not, and accordingly makes a call to the server 314 or sends the addressed text SMS message 404. If the user 202 chooses to include 403 a voice SMS message, the user 202 is connected to a server 314 through the network interfaces 309 provided as a part of the mobile device's hardware/firmware 308. The user 202 records the voice message on the server 314. On completion of recording of the voice message, a voice message notification is added to the text SMS message and transmitted to a recipient 405*a*.

The voice message notification may be added to the text SMS message by forwarding the addressed text SMS message to the server 314 via a data transport such as SMS, USSD or HTTP. The voice notification is added to the addressed text SMS message in the server 314. In another embodiment, the voice message notification may be added to the addressed text SMS message by the client application 201*a*. The client application 201*a* communicates with the server 314 and receives the information required for the construction of the voice message notification from the server 314. The client application 201*a* based on the received information may add the voice message notification to the text SMS message. The recipient may access the recorded voice message on the server 314 through the information included in the voice message notification. If the user 202 chooses to send a text message without including a voice message, a text message is sent to the recipient as a normal text message 405*b*. The recipient is provided with an option of replying to the received voice SMS message.

Figure 6:
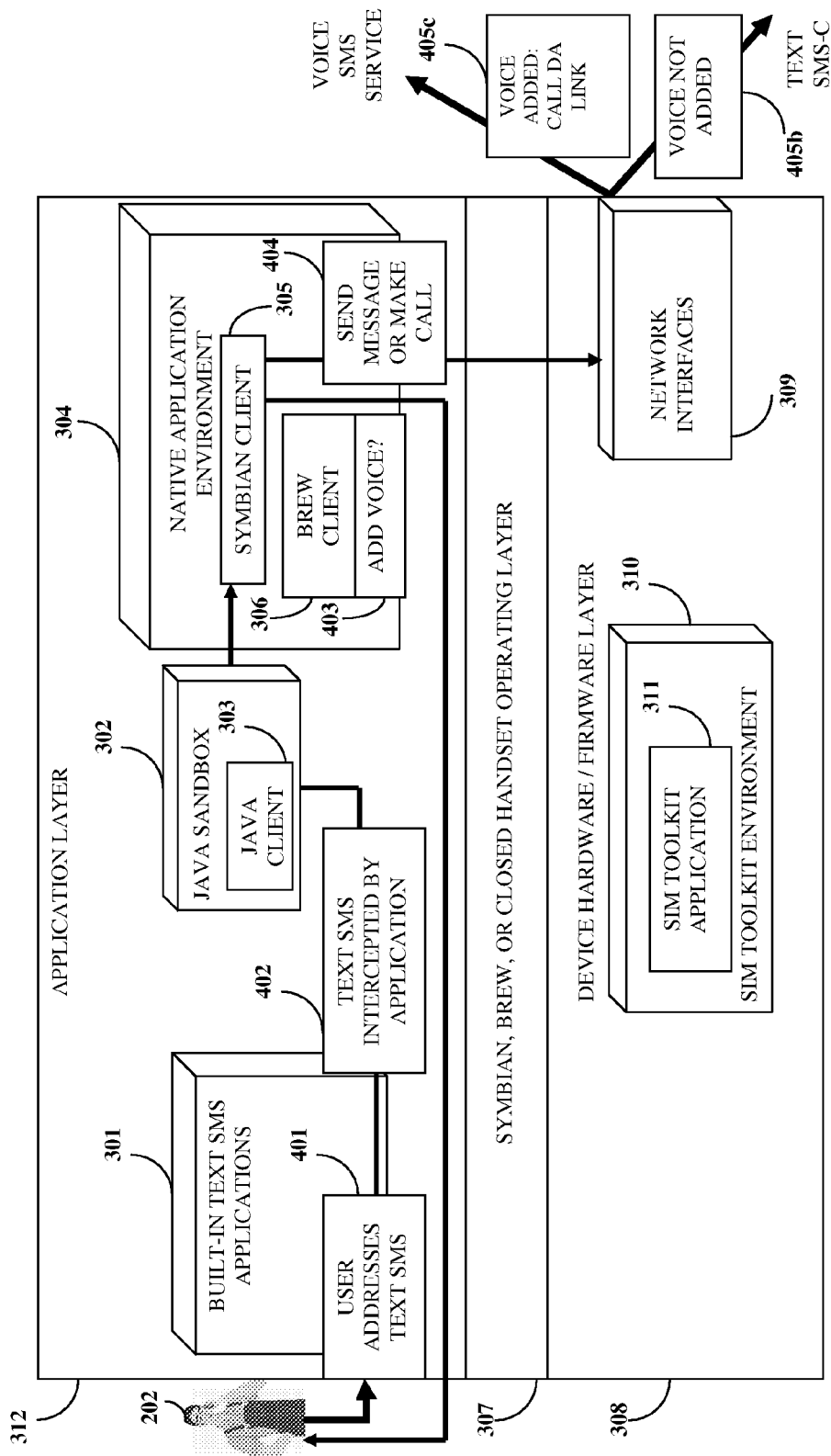
FIG. 6 illustrates a third embodiment of the method for sending a voice SMS message to a plurality of recipients using a client application.

FIG. 6 illustrates a third embodiment of the method for sending a voice SMS message to a plurality of recipients, using a client application 201*a*. Exemplarily, the client application 201*a* is the native Symbian application residing in the native application environment 304. A text message is sent 401 by the user 202 and addressed to a plurality of recipients using a built-in text SMS application 301 residing on the user's mobile device 201. The user 202 addresses the text SMS message to the plurality of recipients by selecting the recipients' addresses from the native address book stored on the mobile device 201 or on the SIM of the mobile device 201, and other integrated source of addresses such as the user's call history.

The addressed text message is intercepted 402 by the Symbian application residing on the native application environment 304. The user 202 is prompted whether a voice SMS message needs to be included or not, and accordingly makes a call to the server 314 or sends the addressed text SMS message 404. If the user 202 chooses not to include the voice message, the text SMS is sent to each of the plurality of recipients. If the user 202 chooses to add 403 a voice SMS message, the user 202 is connected to a server 314 through the network interfaces 309 provided as a part of the mobile device's hardware. In one embodiment the user 202 records the voice message on to a server 314 through a direct access (DA) link 405*c* or by using a direct access number to connect to the server 314. DA links/numbers are provisioned to the client application 201*a* over the air (OTA), for example via SMS, during initialization phase. Over the Air (OTA) provisioning allows the delivery of the DA links/numbers that the client application 201*a* will use when communicating message sequence information to the server 314. In another embodiment an unstructured supplementary service data (USSD) channel may be employed to activate a DA link to record the voice message. The DA and USSD are used to communicate message sequence information to associate the voice call with the corresponding recorded voice message. The message sequence information could take the form of a unique number generated by the client application 201*a*. The generated unique number is communicated to the server 314 in the network 313 to enable the network server 314 to associate an incoming call for messages being sent at nearly identical times and/or to accommodate delay and altered order in the arrival of SMS text messages at the server 314 in the network 313. After the user's voice message is recorded, a voice message notification is added to the text SMS message. The text SMS message along with the voice message notification is sent to each of the plurality of recipients.

Upon receiving a voice SMS message, each of the recipients may use voice SMS messaging to reply back to the user 202. In another embodiment, a reply-all option may be employed in group messages. Using the reply-all option a particular recipient may send a voice SMS message to all the other recipients including the user 202.

Figure 7:
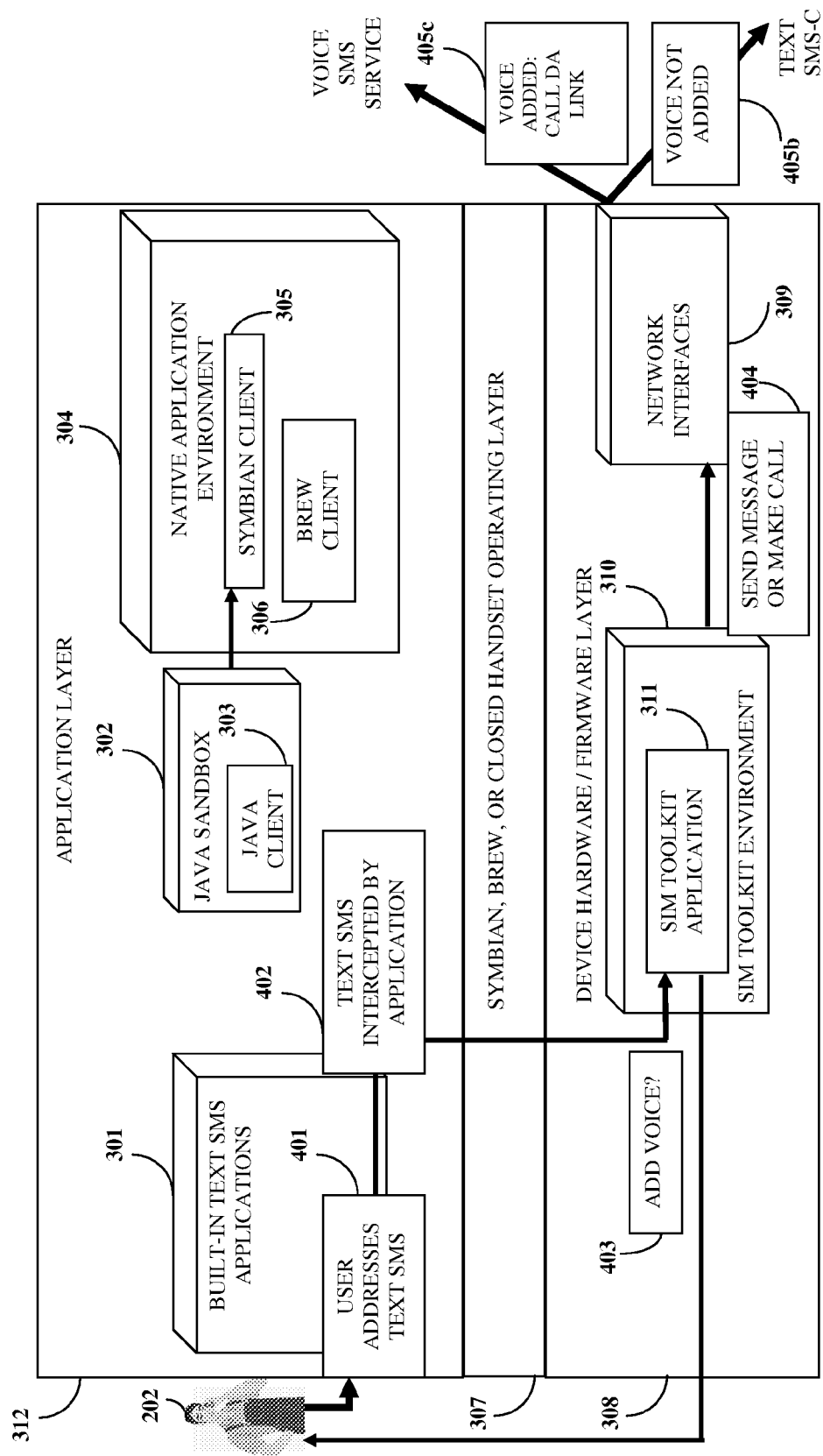
FIG. 7 illustrates a fourth embodiment of the method for sending a voice SMS message to a plurality of recipients, using a client application.

FIG. 7 illustrates a fourth embodiment of the method for sending a voice SMS message to a plurality of recipients, using a client application 201*a*. In the fourth embodiment, the client application 201*a* is the SIM toolkit application 311 residing in the SIM toolkit environment 310. A user 202 addresses 401*a* text SMS message to a plurality of recipients, using a built-in text SMS application 301 residing on the user's mobile device 201. The user 202 addresses the text SMS message to the plurality of recipients by selecting the recipients' addresses from the native address book of the mobile device 201, from the SIM present on the mobile device 201, or from other integrated sources of addresses such as call history.

The addressed text SMS message is intercepted 402 by the SIM toolkit application 311. The user 202 is prompted whether a voice SMS message needs to be included or not, and accordingly makes a call to the server 314 or sends the addressed text SMS message 404. If the user 202 chooses not to include the voice message, the text SMS message is directly sent to each of the plurality of recipients. If the user 202 chooses to add 403 a voice SMS message, the user 202 is connected to a server 314 through the network interfaces 309 provided as a part of the mobile device's hardware. In one embodiment the user 202 records the voice message on to the server 314 through a direct access (DA) link 405*c* or by using a direct access number to connect to the server 314. DA links/numbers are provisioned to the client application 201*a* over the air (OTA), for example via SMS, during initialization phase. Over the Air (OTA) provisioning allows the delivery of the DA links/numbers that the client application 201*a* will use when communicating message sequence information to the server 314. In another embodiment an unstructured supplementary service data (USSD) channel may be employed to activate a DA link to record the voice message. The DA and USSD are used to communicate message sequence information to associate the voice call with the corresponding recorded voice message. The addressed text SMS message is attached with a voice message notification. The recipients may use the voice message notification to access the voice message recorded on the server 314. The text SMS message along with the notification is sent to each of the plurality of recipients.

It will be readily apparent to those skilled in the art that the various methods and algorithms described herein may be implemented in a computer readable medium, e.g., appropriately programmed for general purpose computers and computing devices. Typically a processor, for e.g., one or more microprocessors will receive instructions from a memory or like device, and execute those instructions, thereby performing one or more processes defined by those instructions. Further, programs that implement such methods and algorithms may be stored and transmitted using a variety of media, for e.g., computer readable media in a number of manners. In one embodiment, hard-wired circuitry or custom hardware may be used in place of, or in combination with, software instructions for implementation of the processes of various embodiments. Thus, embodiments are not limited to any specific combination of hardware and software. A processor means any one or more microprocessors, Central Processing Unit (CPU) devices, computing devices, microcontrollers, digital signal processors, or like devices. The term "computer-readable medium" refers to any medium that participates in providing data, for example instructions that may be read by a computer, a processor or a like device. Such a medium may take many forms, including but not limited to, non-volatile media, volatile media, and transmission media. Non-volatile media include, for example, optical or magnetic disks and other persistent memory volatile media include Dynamic Random Access Memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during Radio Frequency (RF) and Infrared (IR) data communications. Common forms of computer-readable media include, for example, a floppy disk, a flexible disk, hard disk, magnetic tape, any other magnetic medium, a Compact Disc-Read Only Memory (CD-ROM), Digital Versatile Disc (DVD), any other optical medium, punch cards, paper tape, any other physical medium with patterns of holes, a Random Access Memory (RAM), a Programmable Read Only Memory (PROM), an Erasable Programmable Read Only Memory (EPROM), an Electrically Erasable Programmable Read Only Memory (EEPROM), a flash memory, any other memory chip or cartridge, a carrier wave as described hereinafter, or any other medium from which a computer can read. In general, the computer-readable programs may be implemented in any programming language. Some examples of languages that can be used include C, C++, C#, or JAVA. The software programs may be stored on or in one or more mediums as an object code. A computer program product, comprising computer executable instructions embodied in a computer-readable medium, comprises computer parsable codes for the implementation of the processes of various embodiments.

The present invention can be configured to work in a network environment including a computer that is in communication, via a communications network, with one or more devices. The computer may communicate with the devices directly or indirectly, via a wired or wireless medium such as the Internet, Local Area Network (LAN), Wide Area Network (WAN) or Ethernet, Token Ring, or via any appropriate communications means or combination of communications means. Each of the devices may comprise computers, such as those based on the Intel® processors, AMD® processors, UltraSPARC® processors, etc. that are adapted to communicate with the computer. Any number and type of machines may be in communication with the computer.

The foregoing examples have been provided merely for the purpose of explanation and are in no way to be construed as limiting of the present method and system disclosed herein. While the invention has been described with reference to various embodiments, it is understood that the words, which have been used herein, are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

We claim:

1. A method for voice short message service messaging, comprising the steps of:
   providing a client application on a mobile device;
   creating a text message by a user on said mobile device;
   addressing said text message to a recipient;
   integrating voice content to the text message using methods of recipient addressing as used by text short message service messaging, comprising the steps of:
      intercepting said addressed text message by said client application;
      prompting said user to include a voice message with the addressed text message;
      connecting the user to a server, wherein said server records and stores said user's voice message; and
      transmitting a voice message notification with the addressed text message to said recipient by said client application; and
   using said voice message notification by said recipient to access and listen to said voice message stored in said server.

2. The method of claim 1, wherein said step of addressing comprises obtaining an address of the recipient from an address book stored on the mobile device.

3. The method of claim 2, wherein said address is stored in a memory storage means of the mobile device.

4. The method of claim 2, wherein said address is stored in a subscriber identity module of the mobile device.

5. The method of claim 1, wherein said step of addressing comprises obtaining addresses of recipients from a call history stored on the mobile device.

6. The method of claim 1, wherein said step of transmitting said voice message notification further comprises the steps of:
   forwarding the addressed text message to a server;
   attaching the voice message notification to the addressed text message in said server; and
   sending the addressed text message with said attached voice message notification to the recipient.

7. The method of claim 1, wherein said step of transmitting said voice message notification further comprises the steps of:
   receiving notification construction information by the client application from a server;
   attaching the voice message notification to the addressed text message in the client application using said notification construction information; and sending the addressed text message with said attached voice message notification to the recipient.

8. The method of claim 1, wherein said voice message notification is transmitted to a plurality of recipients.

9. The method of claim 8, wherein said plurality of recipients are provided with a group reply option to each of the plurality of recipients upon receiving the voice message notification and the text message.

10. A system for voice short message service messaging, comprising:
- a client application on a mobile device, wherein said client application integrates voice content to a text message created by a user using methods of recipient addressing as used by text short message service messaging;
- a memory storage means on said mobile device for storing a list of addresses of recipients;
- a user interface on the mobile device for said user to input voice messages and text messages; and
- a server for remotely recording and storing said voice messages of the user, wherein said server is configured to provide access to said recipient for listening to said recorded voice message; and
- said client application for transmitting a voice message notification with an addressed text message to said recipients.

11. The system of claim 10, wherein said server comprises a first server for storing the voice messages of the user.

12. The system of claim 10, wherein said server comprises a second server for transmitting said voice message notification with said addressed text message to the recipients.

13. The system of claim 10, wherein the client application transmits one of a text message, a voice message, and a combination thereof.

14. The system of claim 10, wherein the client application is provided on an operating system of the mobile device.

15. The system of claim 10, wherein the client application is provided on a subscriber identity module of the mobile device.

16. A computer program product comprising computer executable instructions embodied in a non-transitory computer-readable medium, said computer program product including:
- a first computer parsable program code for creating a text message by a user on a mobile device;
- a second computer parsable program code for addressing said text message to a recipient using an address stored on said mobile device;
- a third computer parsable program code for integrating voice content to the text message using methods of recipient addressing as used by text short message service messaging, further comprising:
  - a fourth computer parsable program code for intercepting said addressed text message;
  - a fifth computer parsable program code for prompting said user to include a voice message with the addressed text message; and
  - a sixth computer parsable program code for connecting the user to a server, wherein said server records and stores said user's voice message; and
  - a seventh computer parsable program code for transmitting a voice message notification with the addressed text message to said recipient;
- an eighth computer parsable program code for providing access to said server for listening to said recorded voice message.

* * * * *